US005724524A

United States Patent [19]

Hunt et al.

[11] Patent Number: 5,724,524
[45] Date of Patent: Mar. 3, 1998

[54] METHOD AND SYSTEM FOR LISTING, BROKERING, AND EXCHANGING CARRIER CAPACITY

[75] Inventors: William M. Hunt, Shelton; Paul A. Levitsky, Bridgeport, both of Conn.

[73] Assignee: Pitney Bowes, Inc., Stamford, Conn.

[21] Appl. No.: 572,769

[22] Filed: Dec. 15, 1995

[51] Int. Cl.$^6$ .................................................. G06F 17/60
[52] U.S. Cl. ........................................................ 395/237
[58] Field of Search .................................. 395/237, 208, 395/209; 364/424.027, 424.029, 424.031, 468.05, 468.06

[56] References Cited

U.S. PATENT DOCUMENTS

| | | | |
|---|---|---|---|
| 4,486,853 | 12/1984 | Parsons | 364/900 |
| 4,752,877 | 6/1988 | Roberts et al. | |
| 4,903,201 | 2/1990 | Wagner | 364/900 |
| 4,953,085 | 8/1990 | Atkins et al. | |
| 5,063,506 | 11/1991 | Brockwell et al. | 395/207 |
| 5,157,714 | 10/1992 | Spicer | 379/89 |
| 5,258,908 | 11/1993 | Hartheimer et al. | 364/408 |
| 5,297,031 | 3/1994 | Gutterman et al. | 364/408 |
| 5,303,144 | 4/1994 | Kawashima et al. | 395/208 |
| 5,305,200 | 4/1994 | Hartheimer et al. | 364/408 |
| 5,414,838 | 5/1995 | Kolten et al. | 395/600 |
| 5,420,405 | 5/1995 | Chasek | 235/379 |
| 5,428,606 | 6/1995 | Moskowitz | 370/60 |

OTHER PUBLICATIONS

Craig Stedman, "Shipping service keeps users truckin'", Computerworld, vol. 30, issue 26, pp. 39, 41, Jun. 1996.
Richard Beilock et al., "Brokerage and the potential for electronic marketing of produce transportation", 12 pages Dialog database file copy of Transporation Journal, vol. 31, n4, p.60, Sep. 1992.

Primary Examiner—Donald E. McElheny, Jr.
Attorney, Agent, or Firm—Melvin J. Scolnick; David E. Pitchenik; Robert E. Meyer

[57] ABSTRACT

The invention is a method and system for listing and brokering a commodity and its financial derivatives. The method identifies a plurality of characteristics of a particular commodity, and then enters those characteristics into the database of a data processing system utilizing a real-time clock. An exchange market for the commodity is established based upon a pre-selected set of its characteristics; and, after a market price for the commodity has been set, a class (or classes) of financial derivatives is established together with a financial exchange market for those derivatives. The characteristics of the derivatives comprise: a common descriptive link between varied commodity types; a contract length that runs from the purchase date of the contract to the performance date for the commodity; and, a contract price. The system of the subject invention comprises a number of elements which include: data processing means; means for determining whether a match exists based upon a comparison of the commodity offered for sale and that requested for purchase or exchange; display means; means for selecting the matched entry for purchase and/or exchange; and means for determining and selecting a class of financial derivatives. The data processing means of the system, in turn, further comprises a system controller which is further comprised of: a data processing system; data entry means; memory means; and, communication means for communicating data between the system controller and a plurality of input and output points.

16 Claims, 10 Drawing Sheets

METHOD AND SYSTEM FOR LISTING, BROKERING, AND EXCHANGING CARRIER CAPACITY

RELATED APPLICATION

Reference is made to Pat. Application Ser. No. 08/572,916 (Attorney Docket No. E-442), entitled METHOD AND SYSTEM FOR BROKERING EXCESS CARRIER CAPACITY, assigned to the assignee of this application and filed on even date herewith.

BACKGROUND OF THE INVENTION

The brokering of commodities in general has been practiced for centuries in all parts of the world, but the advancements in technology over the past decade have been such that global transactions are now closed in a matter of seconds and the trading ranges between a market fluctuation and a market correction have also been reduced to a matter of seconds. The effect of decreasing the gap in trading ranges has resulted in a distinct advantage to those who can react and trade commodities, bonds, or equities in the fastest possible manner while closely studying fluctuations and doing so with a minimum of error.

One example of the effort to combat the effects of time, even if that effect exists only in a span of seconds, is U.S. Pat. No. 5,305,200 for a FINANCIAL EXCHANGE SYSTEM HAVING AUTOMATED RECOVERY/ROLLBACK OF UNACKNOWLEDGED ORDERS, issued to Hartheimer et al. on Apr. 19, 1994. Hartheimer et al. was concerned with the need for a reliable and impartial automated exchange system which can monitor the relatively small time gap between the point of time that an outstanding offer to sell is withdrawn from the market (either due to interruption or intent), and the corresponding notice of interruption has been received by a party seeking to place an order against the outstanding offer. The time gap referred to is crucial if it is subsequently determined that an order acceptance occurred during the gap; the larger the time gap, the larger the uncertainty of trade outcome, generally.

An underlying principle of commodities, equities, or bond trading is that the asset sought to be traded have an intrinsic value which can be determined, usually by a market exchange, and that that value will shift based upon the vagaries of the market. The determination of market value can be aided by systems such as that described in U.S. Pat. No. 4,713,761, SYSTEM FOR CENTRALIZED PROCESSING OF ACCOUNTING AND PAYMENT FUNCTIONS, issued Dec. 15, 1987 to Sharpe et al., and in U.S. Pat. No. 5,222,018, also for a SYSTEM FOR CENTRALIZED PROCESSING OF ACCOUNTING AND PAYMENT FUNCTIONS, and issued Jun. 22, 1993 to Sharpe et al., these systems do not provide a means or method for determining or defining carrier space; these systems merely provide a revenue or cost value which can then be used by analysts in determining a market value for the listed commodity.

The ability to extract historical financial and market information, and to evaluate shifts due to events that pressure those markets, has been addressed by such art as U.S. Pat. No. 5,414,838 for a SYSTEM FOR EXTRACTING HISTORICAL MARKET INFORMATION WITH CONDITION AND ATTRIBUTED WINDOWS, issued May 9, 1995 to Kolton et al. Again, the element of speed in reacting to the vagaries of the market provides the asset trading markets with winners and losers on a day to day basis. Transaction time for financial markets has been addressed by such art as U.S. Pat. No. 5,420,405 for a SECURE, AUTOMATED TRANSACTION SYSTEM THAT SUPPORTS AN ELECTRONIC CURRENCY OPERATING IN MIXED DEBIT AND CREDIT MODES, issued to Norman E. Chasek on May 30, 1995.

However, while the financial markets are reacting to minimize the effects of time, the underlying industries on which they trade and speculate are seeking stability and/or growth over time. One industry in particular, that has had to balance the effects of time and stability, is the carrier industry which is represented by the diverse interests of the various transportation modes that comprise it. The shippers that utilize the carrier industry have placed new burdens upon it.

The ability of shippers to get parcels from the loading dock to the final destination in shorter time spans and at less cost has increased in recent years. The growth of the overnight carders, and the consistency of the two and three day delivery carriers, has created vast fleets of vehicles representing each of the many transportation modes.

The growth of shipping demand has fueled the drive for efficiencies that each of the carriers has been developing. Technological advances and better methods of doing business have in turn spurred greater demand for carrier services. The net result is that the volume of parcels being shipped has continued to spiral upward.

Systems and methods have been proposed to more efficiently handle the increased volume of parcels and the proliferation of carrier services that are available. Carriers have introduced systems and methods that are targeted to that carrier only. Shippers have looked for systems that provide them with a means to rate or service shop. The object of all of these systems has been to get a parcel on some mode of transport for movement from point A to point B.

Carrier Management Systems such as that described in U.S. Pat. No. 5,040,132, SYSTEM FOR PREPARING SHIPPING DOCUMENTS, issued Aug. 13, 1991 to Schuricht et al., are well known to the art. One such system is the E900 Carrier Management System, developed and marketed by the assignee of the present application. The E900 generally includes as peripheral elements: a microprocessor; keyboard; monitor; platform scale; printer; and possibly a scanner. The E900 system automatically prepares documents for shipping articles to any desired number of different receivers by any selected carrier or mode.

The ability of carriers to respond to shipper needs is based on the carrier's capacity. Carrier capacity is the space that is available at any given time in the vehicle representing the carrier's mode of transport. Capacity, therefore, represents revenue or opportunity to the carrier. For every shipment that leaves the dock of a shipper bound for a particular destination, a carrier makes available a mode of transportation. Each mode of transportation has its unique vehicle for transport: freight cars via rail; containers via ship; cubic inches via truck; etc.

Therefore, an object of the present invention is to shift the financial burden of capacity through the financial markets by providing an opportunity to hedge against the future. While the carriers would have to guarantee that capacity will be available at a time when it is required, the financial burden of the carriers will be minimized by making capital available up front in exchange for capacity later. A further object of the present invention is to provide the financial markets with an ability to trade carrier capacity as a tangible commodity by providing the method and means for doing so.

SUMMARY OF THE INVENTION

According to the invention, the object is achieved and the disadvantages of the prior art are overcome by a method and system for listing and brokering a commodity and its financial derivatives.

The method begins by identifying a plurality of characteristics of a particular commodity such as carrier space, and then entering those characteristics into a data processing system utilizing a real-time clock. Once the commodity characteristics are entered, an exchange market for the commodity is established based upon a pre-selected set of its characteristics. After market price for each commodity listed in the data base has been set, a class or classes of financial derivatives can be established. Then, with the establishment of derivative classes, a financial exchange market for those derivatives can be established.

The characteristics of the commodity to be listed, and subsequently traded, would preferably include: a geographic start point and a geographic end point; a start date and a finish date; a start time and a finish time; a volume; a mode of transportation; and, a cost. These characteristics generally describe carrier space, which is the broad class of commodity to be traded in the preferred embodiment of the present invention.

The entry of the commodity into the data processing system comprises several steps, these include: determining whether or not the commodity is being identified to the data processing system for the first time; and, storing the commodity characteristics in a commodity database if the entry is indeed a first time entry. If the entry is not a first time entry, then the status of the entry with respect to being a candidate for purchase, sale, or trade would need to be determined.

The description or characteristics of the derivatives would be more general in context than that of the commodity itself and could be described by a series of broad categories. These categories might include: all carrier space available during a particular time period in a particular region; all carrier space utilizing a particular mode of transportation within a given time frame; or, a combination of categories. The broad characteristics of the derivatives would comprise a Shipping Equivalent Unit, or SEU.

The SEU comprises a: common descriptive link between varied commodity types; a time period (contract length) that runs from the purchase date of the contract to the performance date of the commodity; and, a contract price. When entering the characteristics of the SEU are entered into the data processing system, the system determines whether the entry is being made for the first time, if so, then the characteristics are entered into the derivatives database and an identifier is issued. If the described derivative has been previously entered into the system, then the system determines the status of the derivative with respect to whether or not that derivative is being exchanged, sold, or traded.

The system which employs the method of the subject invention comprises a number of elements; these include: data processing means for accepting and storing the parameters of the commodity available for sale or exchange; data processing means for entering a description of the commodity desired for purchase or exchange; means for determining whether a match exists based upon a comparison of the commodity offered for sale and that requested for purchase or exchange; means for displaying the matched entry to a system operator; means for selecting the matched entry for purchase and/or exchange; means for determining a class of financial derivatives based upon a pre-determined set of characteristics resident in the commodity descriptions stored in the database; and means for selecting a class of derivatives for purchase and/or exchange.

The data processing means of the system, in turn, further comprises a system controller. The system controller is comprised of a number of elements which include: a data processing system and programs for the management of data; data entry means for entering data into the data processing system; memory means for storing data; and, communication means for communicating data between the system controller and a plurality of input and output points. The input and output points, for the input and output of data, comprise: one or more commodity input points; one or more commodity receiver points; one or more commodity brokerage points; and, one or more derivative exchange points.

DETAILED DESCRIPTION OF THE PREFERRED EMBODIMENTS

Figure 1:
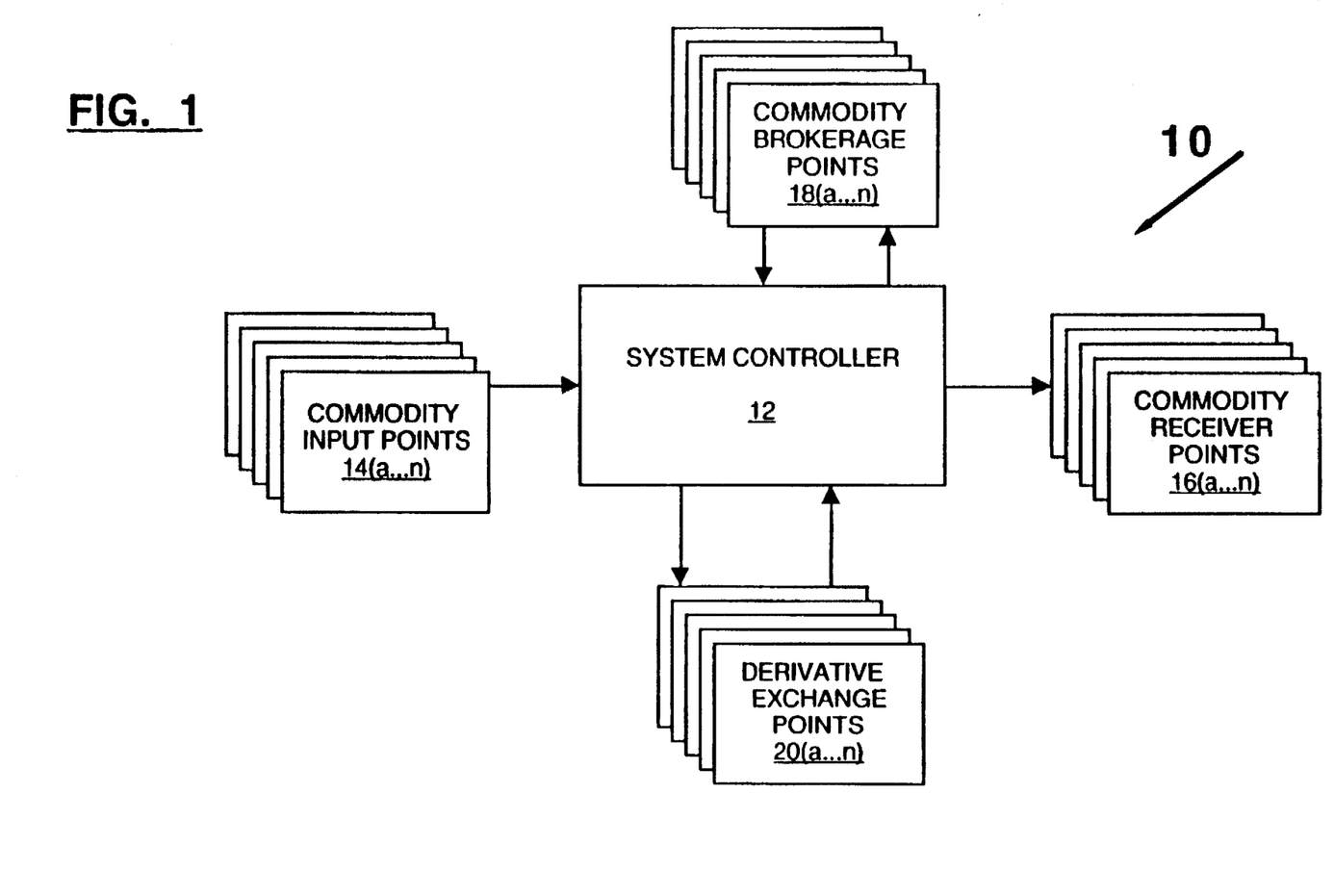
FIG. 1 is a high level overview of the proposed method and system for listing, brokering, and exchanging carrier capacity.

Turning to FIG. 1, there is shown a high level flowchart of the overall system of the subject invention which is designated system 10. System 10 comprises a central hub in the form of a system controller 12 which can be a computer or a data processing system for processing data entered by the system operator; system controller 12 has a real-time clock used for determining when the actual date and time has passed, or is about to pass, the time of performance for the commodity listed or requested. System controller 12 has a number of input and output points which allow nodes located at the input and output points to utilize the inventive method.

Commodity input point 14 can exist as a single point or as multiple points. At commodity input point 14, the description of a commodity to be traded or purchased is entered into system 10 and resides within system controller 12. In a preferred embodiment of the invention, the commodity to be entered is carrier space which is defined as the space or capacity provided by a carrier to a shipper for the movement of goods. Carriers will offer space or capacity in one or more transportation mediums that include: rail, truck, ship, air, or some combination of mediums referred to as mixed-modal. Entry of the commodity into system 10 must include enough information so as to identify the commodity in: time, place, volume, and transportation mode. In an alternative embodiment of the subject invention, system controller 12 resides within each of the input and output points 14, 16, 18, and 20 so that the database of each is redundant to the others with respect to storing commodity data.

Commodity receiver point 16 can exist as a single point or as multiple points. At commodity receiver point 16, the description of a commodity that has been purchased is confirmed to the purchaser by a confirmation transmitted from system controller 12. The confirmation will include an identification of the commodity purchased and a market value for the commodity that will be debited from an account of the purchaser and credited to an account of the carrier listing the commodity.

Commodity brokerage point 18 can exist as a single point or as multiple points. At commodity brokerage point 18, the trading of a commodity between a commodity owner and a secondary purchaser is entered into system 10. A secondary purchaser is defined as a purchaser who did not purchase the commodity to be traded directly from the carrier who introduced the commodity to the market. A request to purchase or trade a particular commodity is entered into system controller 12 which will attempt to seek a match between the commodity requested and commodities available for sale or trade. Alternatively, a listing of commodities available for sale or trade, within certain parameters, can be displayed prior so that a sale or trade request can be subsequently entered.

Derivative exchange point 20 can exist as a single point or as multiple points. At derivative exchange point 20, the trading of a derivative between a derivative owner and a derivative purchaser is entered into system 10. A derivative is defined as a financial instrument whose value is based on the perceived future collective value of a breadbasket of primary instruments. For example, a derivative could be based on the value of all carrier space traveling by air for a ninety period ended on a particular date some time in the future (i.e., 90, 120, 180 days forward). A request to purchase or trade a particular derivative is entered into system controller 12 which will attempt to seek a match between the derivative requested and derivatives available for sale or trade. Alternatively, a listing of derivatives available for sale or trade, within certain parameters, can be displayed prior so that a sale or trade request can be subsequently entered.

Figure 2:
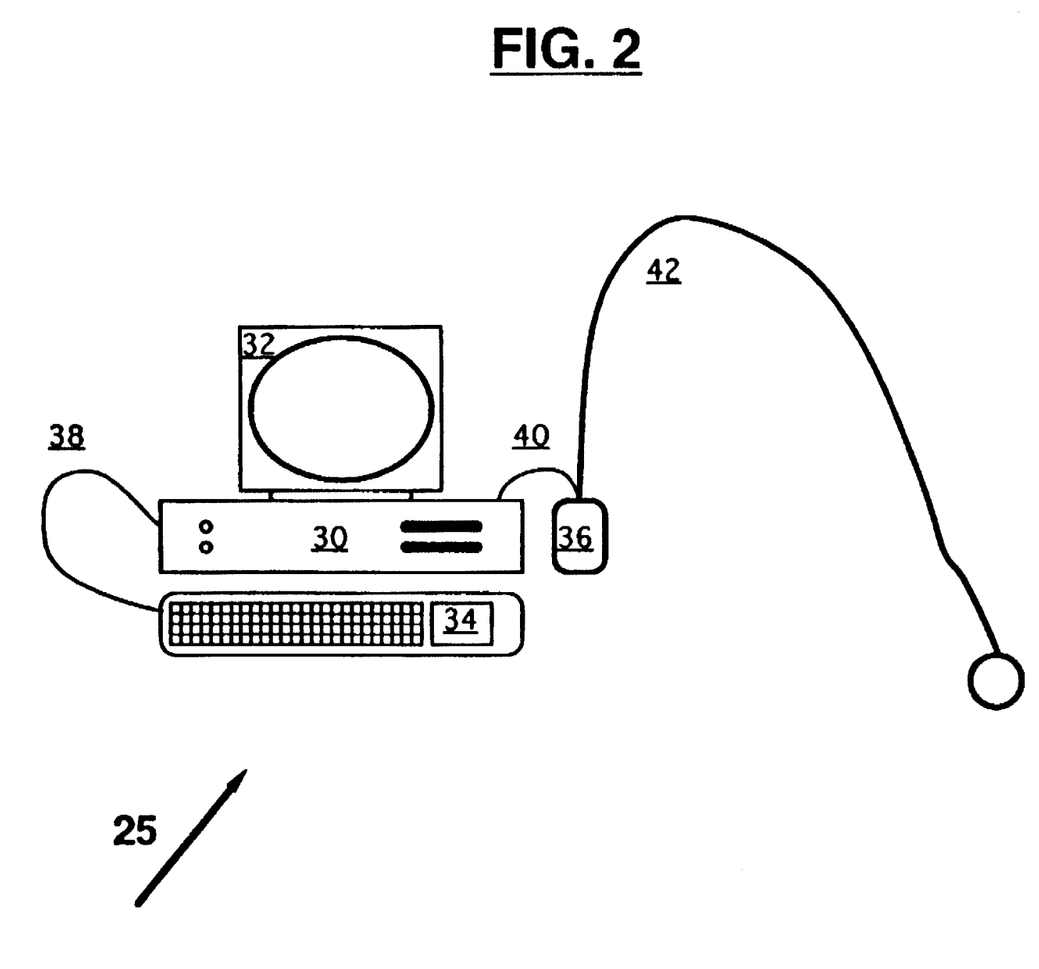
FIG. 2 is a drawing of the apparatus that can be used as an entry point into the system so as to utilize the method.

Turning to FIG. 2, there is shown subsystem 25 which represents an input/output point that is porting data to system controller 12 shown in FIG. 1. Subsystem 25 comprises: microprocessor 30 for processing data entered by the system operator; microprocessor 30 is operatively connected to monitor 32 where the system operator can view entries made to the system, matches available, or receive notification of a match; keyboard 34, which is used to make data entries to the system, is connected to microprocessor 30 by interface cable 38; and, modem 36, which can transmit data entries to, or receive data entries from, system controller 12, is connected to microprocessor 30 by interface cable 42.

Figure 3:
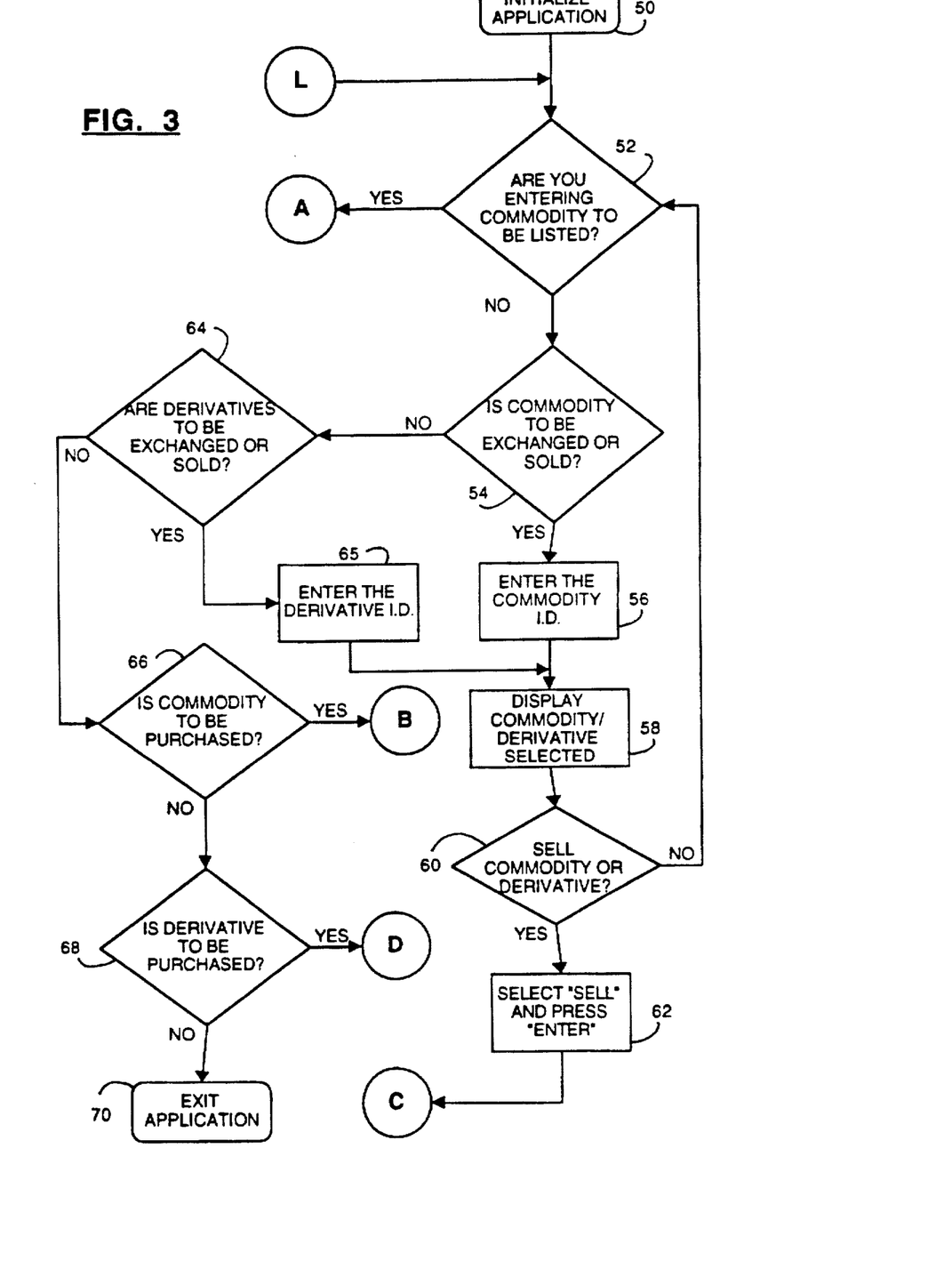
FIG. 3 is a flowchart of the entry into the application comprising the proposed method. It is within this part of the flow, that the system user will determine which path to select with respect to listing, selling, or exchanging a commodity.

Turning to FIG. 3, there is shown a flowchart of the steps for entering a commodity into the system database for subsequent action. The application is initialized at step 50 and proceeds to a query at step 52. Path L, from FIG. 4B, also re-enters at step 52.

Figure 4A:
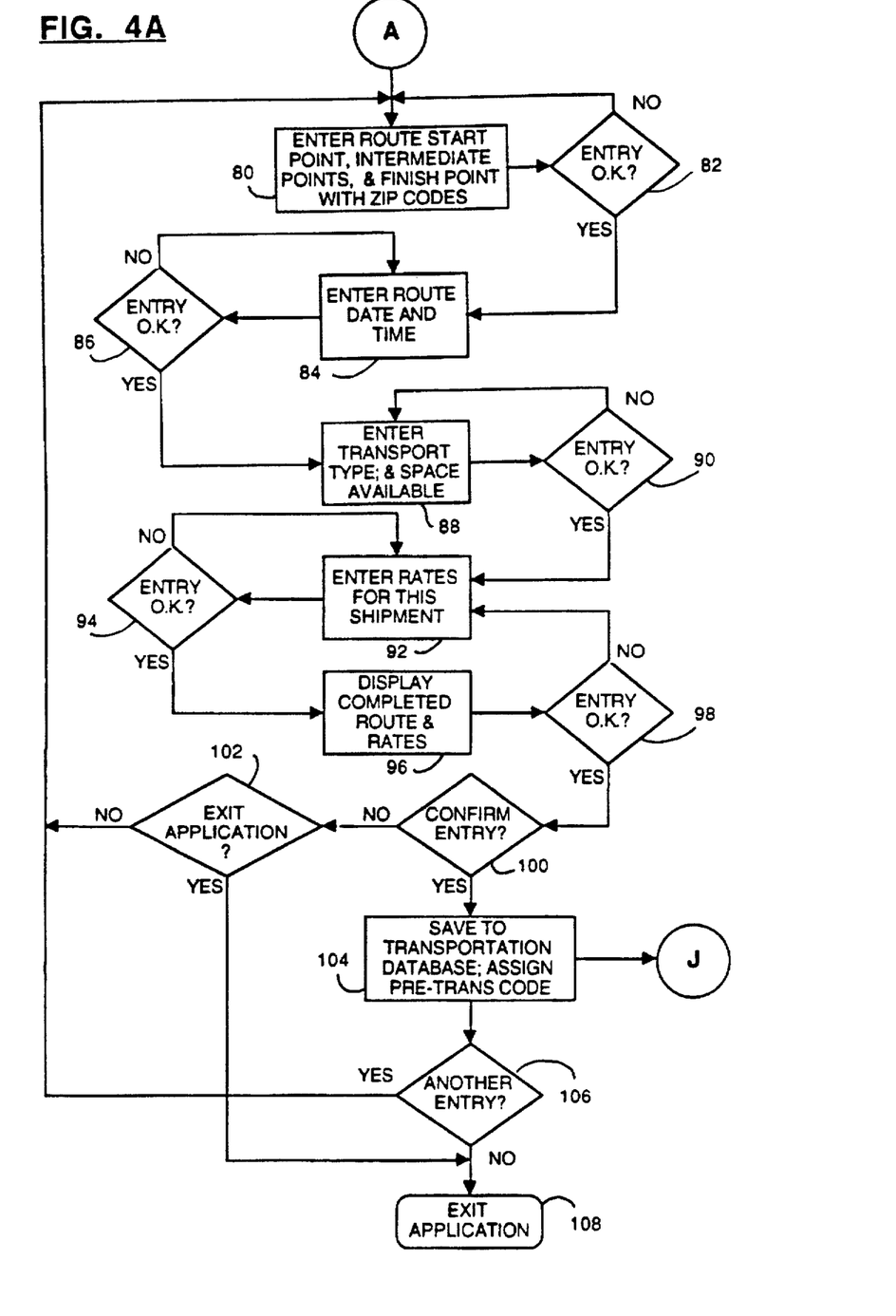
FIGS. 4A and 4B are flowcharts which detail how the parameters for a particular commodity are selected.

The system, after initializing, must determine which input or output point of system 10 is to be accessed by the system user; thus, at step 52, the system queries as to whether or not a commodity is to be listed in the system. If the response is "YES," then the system advances along path A to step 80 as shown in FIG. 4A. If, however, the response to the query at step 52 is "NO," then the system advances to a query at step 54. At step 54, the system queries as to whether or not a commodity is to be exchanged or sold. If the response is "NO," then the system advances to the query at step 64. If, however, the response to the query at step 54 is "YES," then the system advances to step 56 where the commodity identification (I.D.) is entered into the system.

Entering the commodity I.D. at step 56, or derivative I.D. at step 65 assumes that the system operator has been presented with a list of available commodities or derivatives from which a selection is being made, or has previously been issued a transaction code after a commodity or derivative purchase.

Figure 4B:
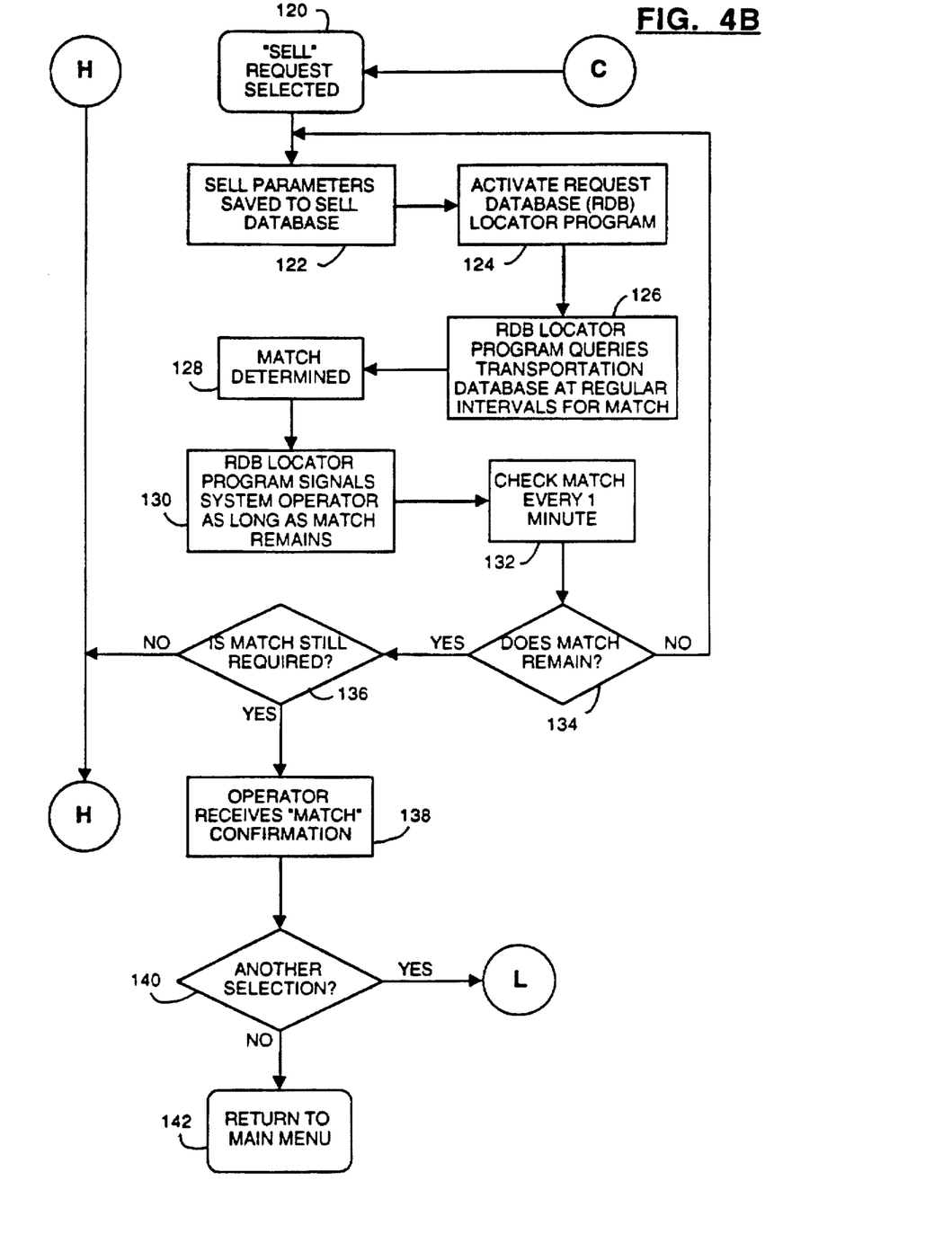

From step 56, the system advances to step 58 where the selected commodity or derivative is displayed to the system operator. The system then queries, at step 60, as to whether or not the commodity or derivative is to be sold. If the response is "NO," then the system returns to step 52. If, however, the response to the query at step 60 is "YES," then the system advances to step 62 where the system operator selects "SELL" from the menu and then presses "ENTER." The system then advances to path C which proceeds to step 120 as shown in FIG. 4B.

Figure 5A:
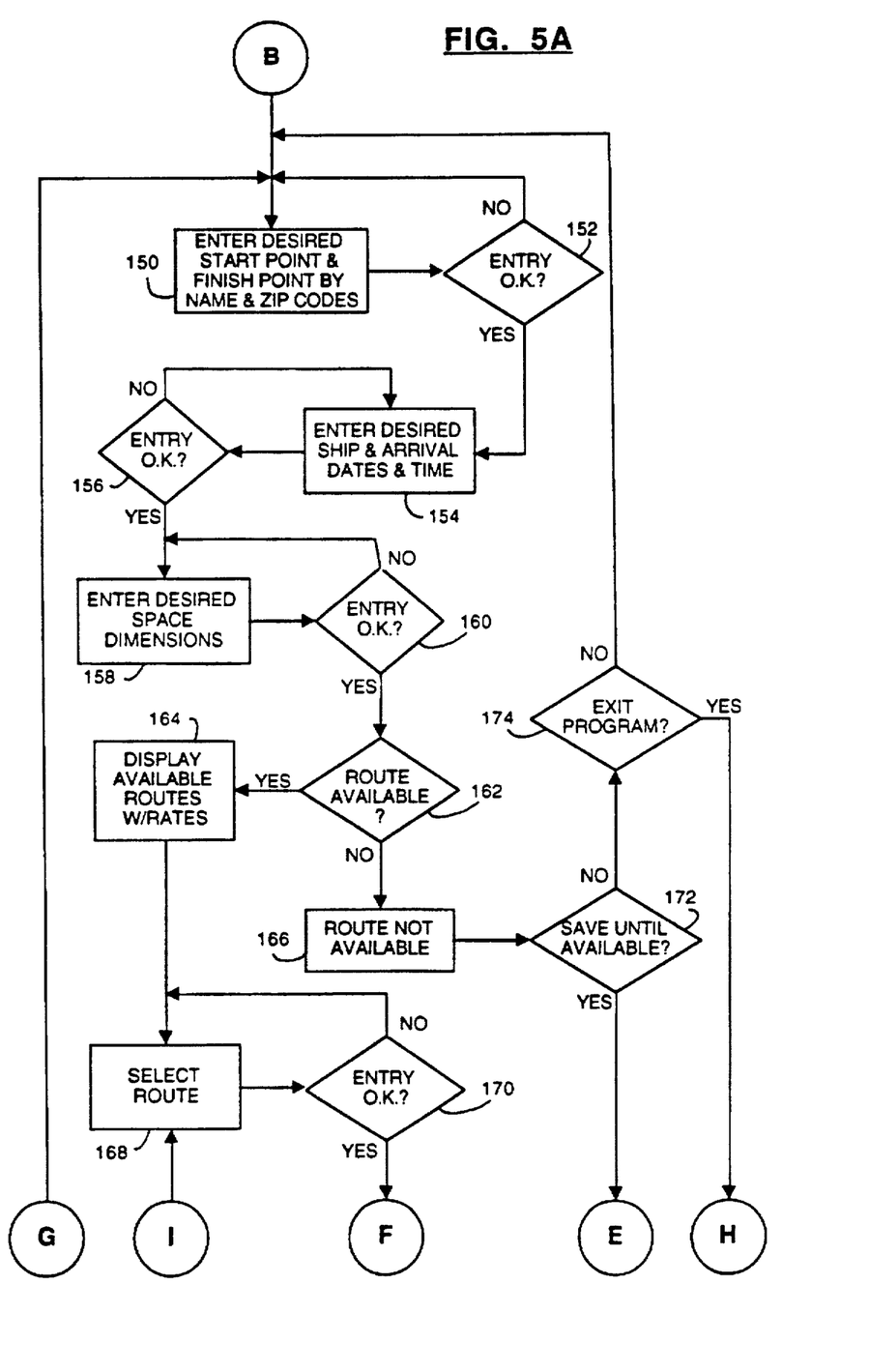
FIGS. 5A, 5B, and 5C are flowcharts which detail the ability of the system user to select a particular commodity within the system.
Figure 6A:
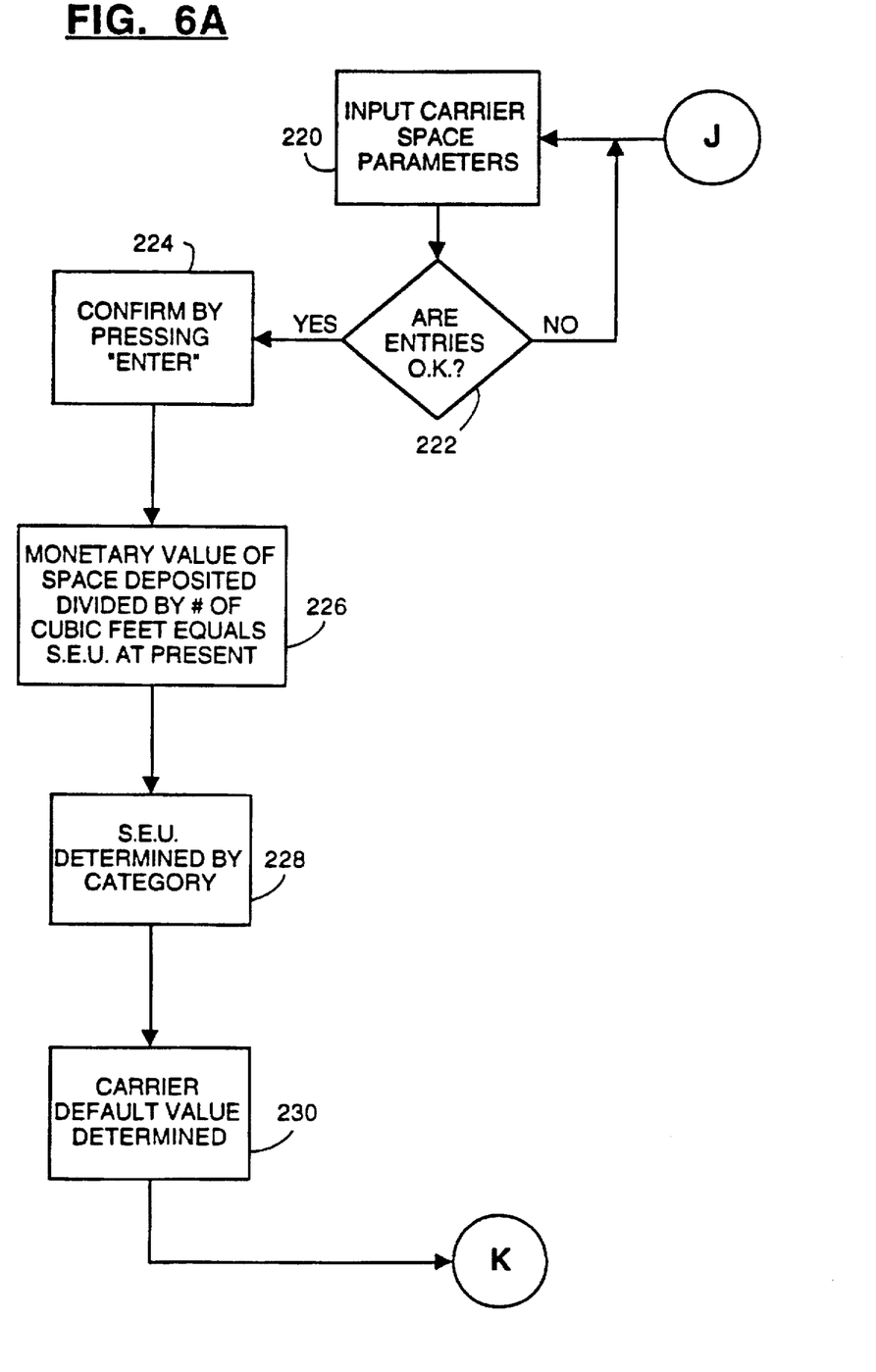
FIGS. 6A and 6B are flowcharts which detail the establishment of Shipping Equivalent Units, or S.E.U.s, and how the system allows the user to trade in derivatives of a particular commodity.
Figure 6B:
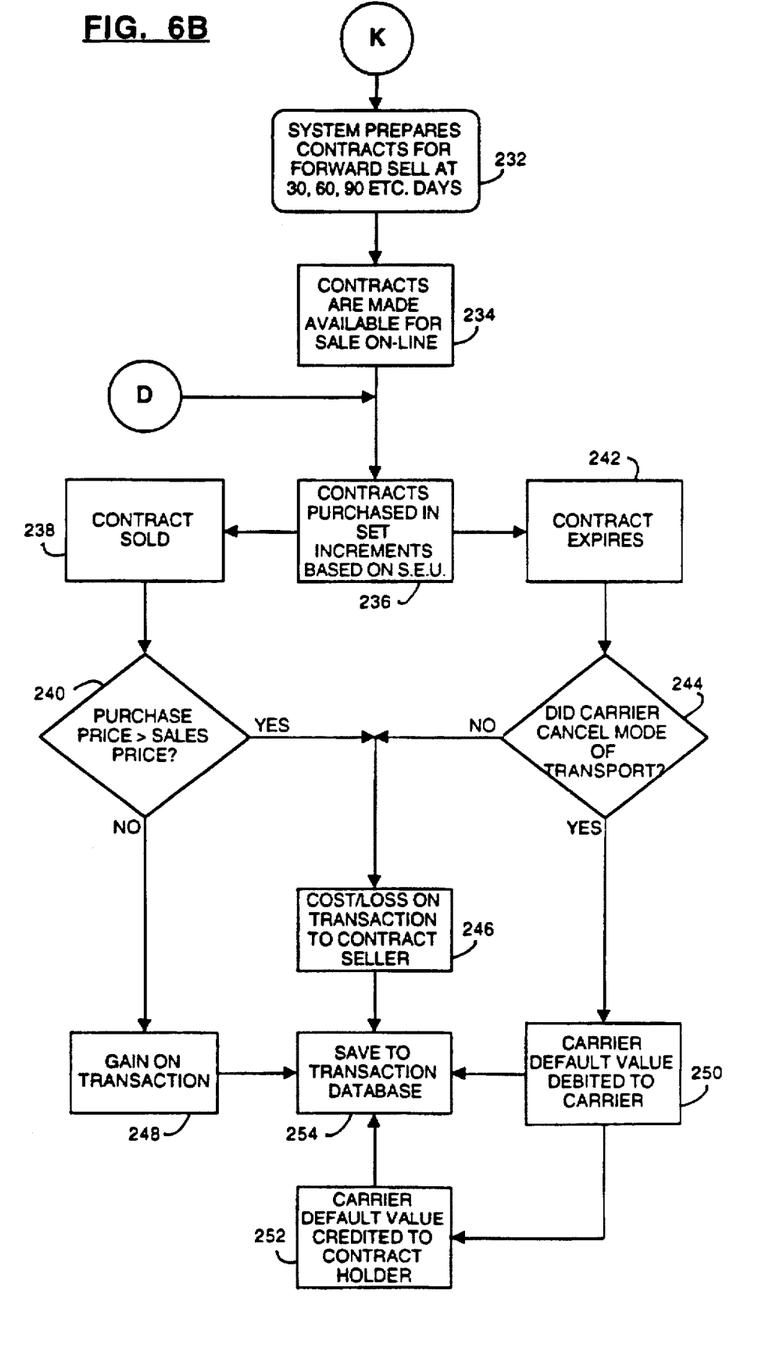

Returning to the query at step 64, the system asks whether or not derivatives are to be exchanged or sold. If the response to the query is "YES," then the system advances to step 65 where the derivative identification (I.D.) is entered into the system. From step 65, the system advances to step 58. If, however, the response to the query at step 64 is "NO," the system advances to a query at step 66. At step 66, the system queries as to whether or not a commodity is to be purchased. If the response to the query is "YES," then the system advances along path B to step 150 as shown in FIG. 5A. If, however, the response to the query at step 66 is "NO," then the system advances to a query at step 68. At step 68, the system queries as to whether or not a derivative is to be purchased. If the response is "YES," then the system advances along path D to step 236 as shown in FIG. 6B. If, however, the response to the query at step 68 is "NO," then the system advances to step 70 and exits the application.

Turning to FIG. 4A, path A continues at step 80 where the route start point and finish point are entered. It is at this step that intermediate points, if any, can be identified. The preferred method of entry is by using start and destination postal codes (zip code in the United States); these are well known in the art. The degree of accuracy required in establishing pick-up and delivery points can be adjusted according to the type of postal code accepted by the system.

For instance, in the United States, the elements of a postal zip code consist of four parts; these are: (i) the "zip code," which consists of 5 digits and refers to geographic area or zone; (ii) the "Zip+4" further breaks down a zip code region into smaller sub-regions, this code consists of four digits added to the base zip code; (iii) "delivery point digits" which consist of two additional digits that further break down a Zip+4 so that the carrier can more accurately pin point an exact location; and, (iv) a check sum digit; the check sum digit would not be required in the present invention. In the mailing services environment, the delivery point digits are abstracted from the street line of the address using the approved algorithm of the postal service; either the U.S.P.S. algorithm or a proprietary algorithm could be used.

After entry of the route start point and finish point at step 80, the method advances to step 82 where the method queries as to whether or not the entry at step 80 was correct. If the response to the query is "NO," then the method returns to path A for re-entry to step 80. If, however, the response to the query at step 82 is "YES," then the method advances to step 84 where the start and end dates and times of the route are entered into the system.

After entry of the route start and end dates and times at step 84, the method advances to step 86 where the method queries as to whether or not the entry at step 84 was correct. If the response to the query is "NO," then the method returns to step 84 for re-entry of the appropriate data. If, however, the response to the query at step 86 is "YES," then the method advances to step 88 where the mode of transport (i.e., sea, truck, rail, air, mixed modal) and the amount or type of space available are entered into the system.

After entry of the mode of transport and the amount of available space at step 88, the method advances to step 90 where the method queries as to whether or not the entry at step 88 was correct. If the response to the query is "NO," then the method returns to step 88 for re-entry of the appropriate data. If, however, the response to the query at step 90 is "YES," then the method advances to step 92 where the rates and applicable charges are entered into the system.

After entry of the rates at step 92, the method advances to step 94 where the method queries as to whether or not the entry at step 92 was correct. If the response to the query is "NO," then the method returns to step 92 for re-entry of the appropriate data. If, however, the response to the query at step 94 is "YES," then the method advances to step 96 where the entered routes and their corresponding rates are displayed back to the system operator on a display or monitor such as monitor 32 or alternatively on a printer, or both on a monitor and a printer.

After display of the routes and rates at step 96, the method advances to step 98 where the method queries as to whether or not the entry displayed at step 96 is correct. If the response to the query is "NO," then the method returns to step 92 for re-entry of the appropriate data. If, however, the response to the query at step 98 is "YES," then the method advances to a query at step 100. At step 100, the method queries as to whether or not to confirm the entry displayed at step 96. If the response to the query is "NO," then the method advances to step 102 where the method further queries as to whether or not the application is to be exited. If the response to the query at step 102 is "NO," then the method returns to path A to re-enter at step 80. If, however, the response to the query at step 102 is "YES," then the method advances to step 108 where the application is exited. Returning to step 100, if the response to the query is "YES," then at step 104 the entered route and appropriate rates are saved to the transportation database as available carrier capacity and are assigned a pre-transaction code.

From step 104, the method proceeds along a dual path. Once the entry has been confirmed to the transportation database at step 104 the system method advances along path J to step 220 as shown in FIG. 6A. Essentially simultaneously, the system advances from step 104 to a query at step 106. At step 106, the method queries as to whether or not another entry is required. If the response to the query is "YES," then the method advances to path A and returns to step 80. If, however, the response to the query at step 106 is "NO," then the method advances to step 108 and exits the application.

The pre-transaction code serves the purpose of identifying the available carrier capacity which has been placed in the transportation database at step 104; the code, and what the code represents, will be displayed to a system operator when selection of available space is required, and can be further used for identification in preparing reports and in the records necessary for regulated industries or transactions. Neither a discussion nor description of the reports required by the carrier industry or by the regulating agencies of either commerce (e.g., Interstate Commerce Commission) or securities (e.g., Securities Exchange Commission) are advanced within this application as they are not required for an understanding of the subject invention.

Turning to FIG. 4B, the flow of path C as it enters from FIG. 3 can be seen. Path C enters at step 120 where a request to sell the commodity is selected. From step 120, the method advances to step 122 where the parameters, or description of the commodity to be sold, are saved to a sell database and copied to the transportation database. From step 122, the method advances to step 124. At step 124, the method activates the request database (RDB) locator program and then advances to step 126.

The purpose of the RDB locator program is to query the transportation database at regular intervals, where the intervals can be programmed at system set-up so as to locate available carrier capacity that may be entered in the system after the initial capacity request is made. The RDB locator program takes the carrier capacity request parameters and asks the transportation database if a suitable match has been entered. The RDB locator program will continue to query the transportation database until it is requested through a pull down menu that the RDB locator program terminate the query, or when the system's real time clock has exceeded the time and date parameters of the carrier capacity request.

Once the RDB locator program is activated at step 124, the method advances to step 126 and begins querying the transportation database at regular intervals for a possible match. If a match is found, the method advances to step 128 where the match is verified; the method then advances to step 130 where the RDB locator program signals the system operator that a match has been located. The RDB locator program will continue to signal the system operator as long as the match remains or until the system operator either selects or discards the match. If a match of the system's real-time clock and the time listed for the commodity's time parameter determine that real-time has passed the commodity time, then the system will determine that the commodity can not be matched and will move the listed commodity out of the transportation database.

From step 130, the method advances to step 132 where the method continues to check the database at regular intervals to determine that the match still exists. The purpose of the continual match check is to recognize that other carrier capacity requests may be entering the system from other entry points and, that the system operator may not be able to respond to the match notification in a timely manner. From step 132, the method advances to step 134 and queries as to whether or not the match still remains. If the response to the query is "NO," then the method returns to enter at step 122; otherwise, if the response to the query at step 1234 is "YES," then the method advances to step 136.

Step 136 queries as to whether or not a match is still required. If the response to the query is "NO," then the method advances to path H which enters at step 212 in FIG. 5C. If, however, the response to the query at step 136 is "YES," then the method advances to step 138 where the system operator receives a confirmation that the match has been made and entered into a transaction database. The method advances to step 140 where the system queries as to whether or not another selection is to be made by the system operator. If the response to the query is "YES," then the method advances along path L to enter at step 52 as shown in FIG. 3. If, however, the response to the query at step 140 is "NO," then the method advances to step 142 where it returns to the system's main menu.

Turning to FIG. 5A, the flow of path B as it enters from FIG. 3 can be seen. Path B enters at step 150 where the start point and end point of a requested route (requested capacity) are entered.

At step 150, the start and end points for the requested route are entered by: street; city; zone; state/province/ prefecture; country; and/or postal code. From step 150, the method advances to a query at step 152 which asks if the entry made at step 150 is correct. If the response to the query is "NO," then the method returns to path B and re-enters at step 150. If, however, the response to the query at step 1522 is "YES," then the method advances to step 154.

At step 154, the ship date and time and the delivery date and time for the route are entered; it is possible, at this point, to enter ranges for date and time so as to broaden the database search for a match. From step 154, the method advances to a query at step 156. The query at step 156 asks whether or not the entry made at step 154 is correct. If the response to the query is "NO," then the method returns to 154 where the proper data can be entered. If, however, the response to the query at step 156 is "YES," then the method advances to step 158.

At step 158, the desired space dimensions (length, width, height, container type, etc.) for the route are entered, and then the system advances to a query at step 160. The query at step 160 asks whether or not the entry made at step 158 is correct. If the response to the query is "NO," then the method returns to 158 where the proper data can be entered. If, however, the response to the query at step 160 is "YES," then the method advances to step 162.

At step 162, the system queries itself as to whether or not the requested route entered is available. To accomplish the query, the system takes the parameters entered at steps 150, 154, and 158 and compares them to the parameters stored in the transportation database as carrier capacity. If the response to the query is "YES," then the method advances to step 164 where the matching route, or routes, is/are displayed. If, however, the response to the query at step 162 is "NO," then the system advances to step 166 and displays "Route Not Available" to the system operator.

From step 166 the method advances to step 172 and queries as to whether or not the requested carrier capacity parameters should be saved until carrier capacity is made available or until the real time clock of the system has advanced beyond the requested date and time parameters. If the response to the query at step 172 is "NO," then the method advances to step 174 and queries as to whether or not to exit the program. If the response to the query at step 174 is "NO," then the method advances to path B where it enters at step 150. If, however, the response to the query at step 174 is "YES," then the method advances along path H to FIG. 5C where it enters at step 212. In looking back to step 172, if the response to the query is "YES," then the method advances along path E to FIG. 5B where it enters at step 180.

Returning to step 164, from the displayed list of available routes, the system operator can scroll up or down the list until selecting an appropriate route by highlighting the entry and entering the selection at step 168. Also entering at step 168 is path I which originated at step 198 of FIG. 5B. From step 168, the method advances to a query at step 170 which asks whether or not the entry selected at step 168 was the correct entry. If the response to the query is "YES," then the method advances along path F to FIG. 5C where it enters at step 200. If the response to the query at step 170 is "NO," then the method returns to enter the flow just after step 164 and prior to step 168.

Figure 5B:
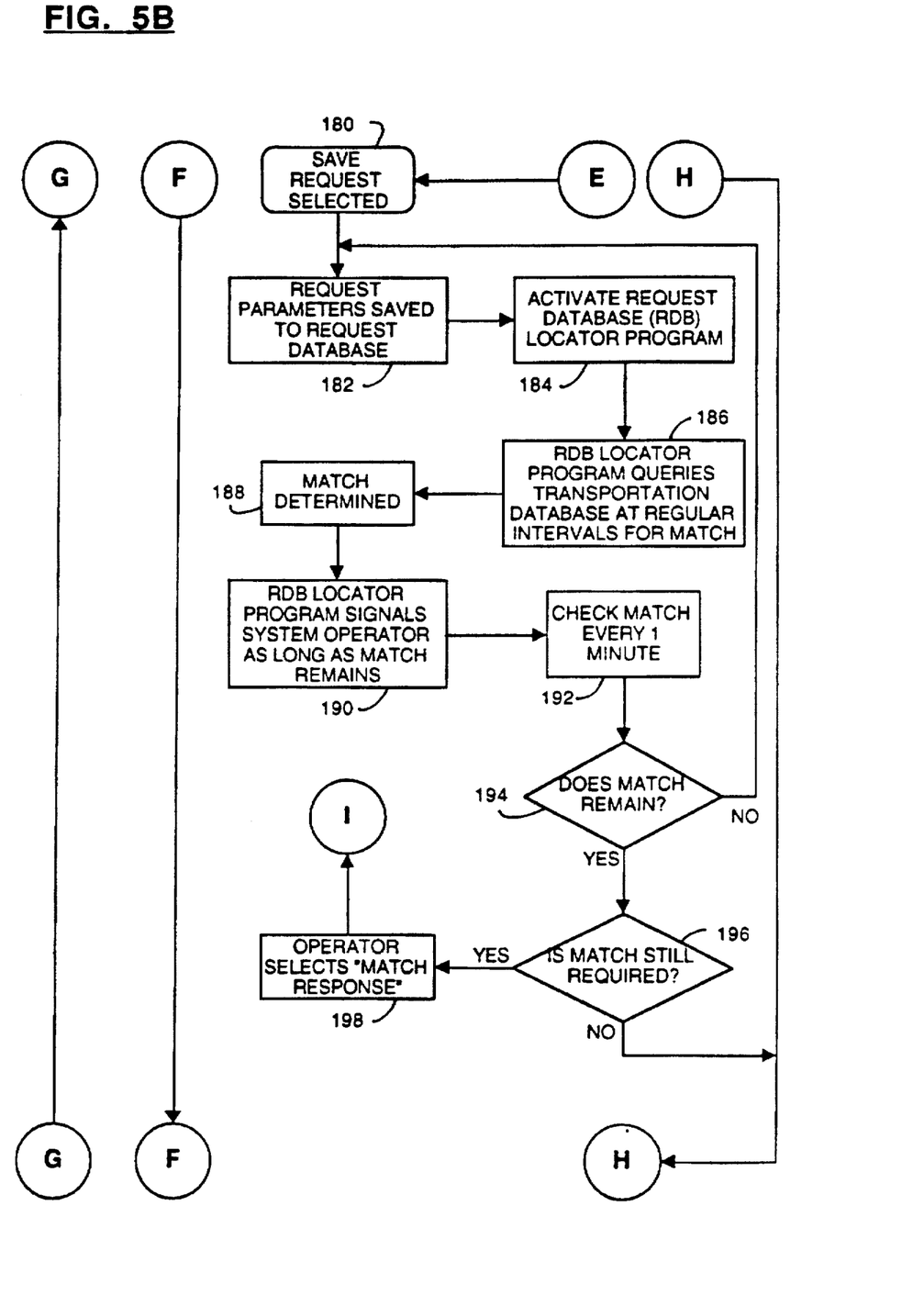

Turning to FIG. 5B, the method enters at step 180 from path E which had originated at step 172.

At step 180, it is determined that the carrier capacity request be saved and at step 182 the request parameters are saved to the request database. From step 182, the method advances to step 184 and activates the request database (RDB) locator program.

Once the RDB locator program is activated at step 184, the method advances to step 186 and begins querying the transportation database at regular intervals for a possible match. If a match is found, the method advances to step 188 where the match is verified; the method then advances to step 190 where the RDB locator program signals the system operator that a match has been located. The RDB locator program will continue to signal the system operator as long as the match remains or until the system operator either selects or discards the match.

From step 190, the method advances to step 192 where the method continues to check at regular intervals to determine that the match still exists. The purpose of the continual match check is to recognize that other carrier capacity requests may be entering the system from other entry points and, that the system operator may not be able to respond to the match notification in a timely manner. From step 192, the method advances to step 194 and queries as to whether or not the match still remains. If the response to the query is "NO," then the method returns to step 182; otherwise, if the response to the query at step 194 is "YES," then the method advances to step 196.

Step 196 queries as to whether or not a match is still required. If the response to the query is "NO," then the method advances to path H which enters at step 212 in FIG. 5C. If, however, the response to the query at step 196 is "YES," then the method advances to step 198 where the system operator selects the match. After selection of the offered match, the method advances along path I to enter at step 168 in FIG. 5A.

Figure 5C:
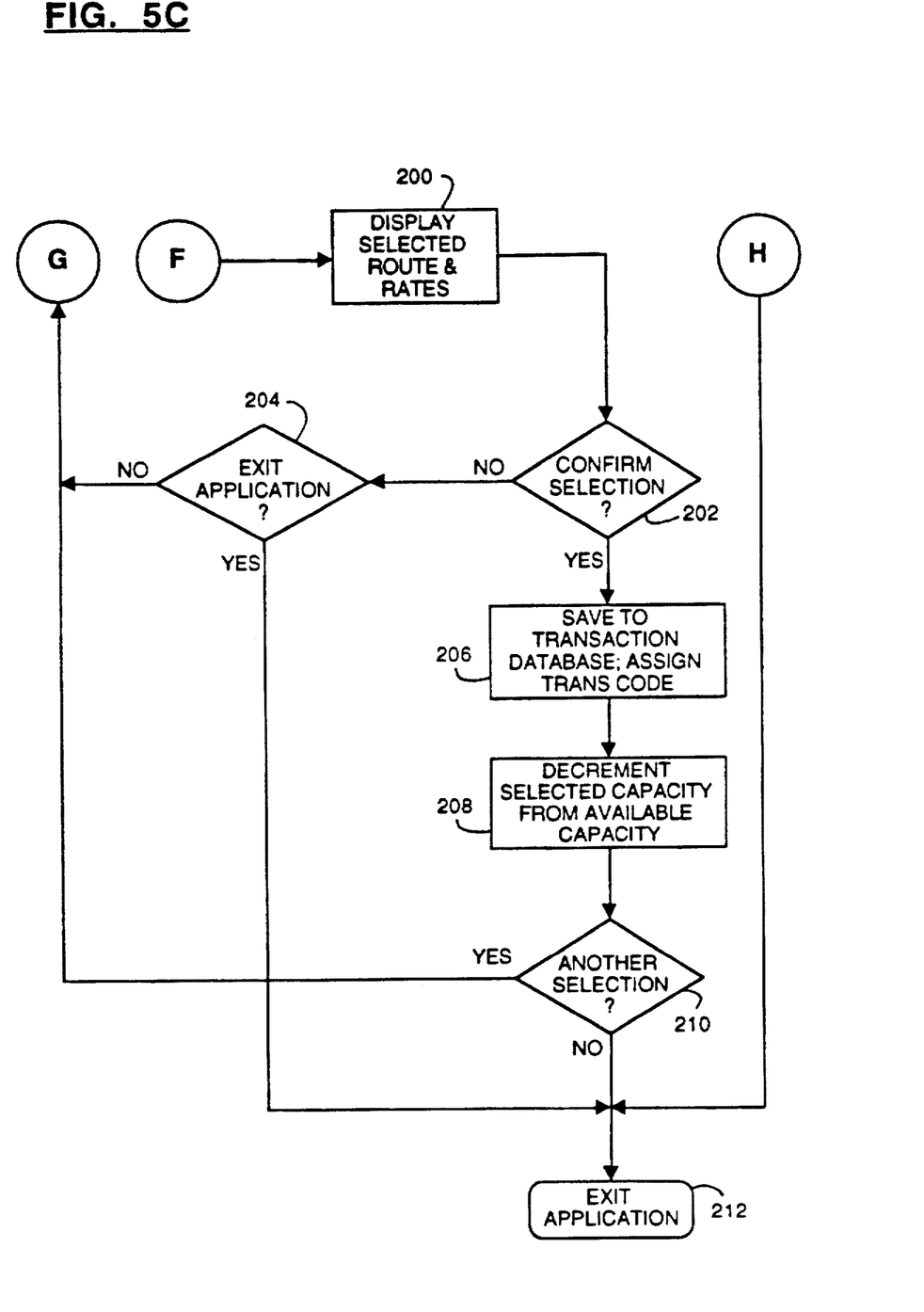

Turning to FIG. 5C, the method enters at step 200 from path F which had originated at step 170 as shown in FIG. 5A.

From path F, the method advances to step 200 where the selected route and rates are displayed. The method then advances to step 202 and queries as to whether or not the entry displayed at step 200 is to be confirmed. If the response to the query is "NO," then the method advances to a query at step 204 which asks if the application is to be exited. If the response to the query at step 204 is "NO," then the method advances along path G to enter at step 250 in FIG. 5A. If, however, the response to the query at step 204 is "YES," then the method advances to step 212 and exits the application.

Returning to step 202, if the response to the query is "YES," then the system advances to step 206 where the selection is saved to the transaction database and assigned a transaction code. The transaction database will serve as the data base from which a number of different reports and documentation can be generated for the appropriate carrier needs and regulatory authorities. In saving to the transaction database, at step 208, the system decrements the selected capacity from the available capacity stored in the transportation database. From step 208, the system advances to step 210 where the method queries as to whether or not another selection is required. If the response to the query is "YES," then the method advances along path G to enter at step 250 in FIG. 5A. If, however, the response to the query at step 210 is "NO," then the method advances to step 212 and exits the application. Additionally, the method enters from path H which had originated at step 174 of FIG. 5A and at step 196 of FIG. 5B and also exits at step 212.

Turning to FIG. 6A, the method enters at step 220 from path J which had originated at step 104 as shown in FIG. 4A. The description and parameters of the carrier space to be saved to the transportation database are input at step 220. From step 220, the method advances to a query posed at step 222.

At step 222, the system queries as to whether the entries made at step 220 are correct. If the response to the query is "NO," then the method returns to path J to enter at step 220. If, however, the response to the query at step 222 is "YES," then the method advances to step 224 where the entries made at step 220 are confirmed. Upon confirmation of the entry of the carrier space parameters, the method advances to step 226, where the system calculates the value of a Shipping Equivalent Unit (SEU).

An SEU is calculated by determining the monetary value of carrier space deposited (entered into the transportation database) divided by the number of cubic feet of the deposited space; this would yield an SEU at present value. This calculation becomes important in determining the value of derivatives by comparing the present SEU value with an estimated SEU value at some future time (e.g., 90, 120, or 180 days forward).

Returning to step 226, the system advances to step 228 where an SEU is determined by category. For instance, all SEUs within a particular geographic region, or all SEUs for air transport in a given 90 day period, could be calculated. The category, or breadbasket, of SEUs by category can then be made available for sale by comparing its present value with an estimated future value; thus, a derivative of the original carrier space is created. From step 228, the method advances to step 230 where a carrier default value is determined.

Step 230 draws its importance from the capital advanced to a carrier at the time that carrier space is entered into the system for sale to shippers and/or speculators. The advance capital must create, on the part of the carrier, an obligation by the carrier to provide the carrier space at the time described in the carrier space parameters entered into the transportation database. If the carrier does not provide the required mode of transportation that gives rise to the carrier space, then the carrier becomes obligated to pay for that carrier space once real time has passed the time parameter of the listed space. The obligation to buy back carrier space becomes the underlying value of the carrier space and its derivatives to the financial and shipping markets. From step 230, the method advances along path K to step 232 as shown in FIG. 6B.

Turning to FIG. 6B, the method enters at step 232 from path K which had originated at steps 228 and 230 as shown in FIG. 6A.

At step 232, the system prepares contracts for forward sale of SEU derivatives at 60, 90, or 120 days forward. It should be noted that any contract length could be determined, regulated only by the market need and/or regulatory agencies. From step 232, the method advances to step 234 where the system makes the contracts available for on-line sale.

The method advances from step 234 to step 236; additionally, path D which had originated at step 68 as shown in FIG. 3, enters the flow just prior to step 236 and after step 234. At step 236, contracts are purchased in set increments based upon the SEU of its component commodity types. There are two paths that advance from step 236.

Path one advances from step 236 to step 238 where a contract once purchased is subsequently sold. Upon sale the method advances to step 240 where the system determines whether or not the purchase price exceeds the sales price of the contract. If the purchase price exceeds the sales price of the contract, then the method advances to step 246 where a cost of the transaction is calculated and debited to the contract seller. The method advances from step 246 to step 254. If, however, the purchase price does not exceed the sales price on the transaction, then the method advances from step 240 to step 248 where a gain on the transaction is calculated and credited to the contract seller. The method then advances from step 248 to step 254.

Path two advances from step 236 to step 242 where a contract once purchased has expired. Upon the expiration of the contract, the method advances to step 244 where the system determines whether or not the carrier had canceled the mode of transport underlying the listed carrier space which in turn is the underlying basis for the SEU. If the carrier did not cancel the mode of transport, then the method advances to step 246 where a loss on the transaction is calculated and debited to the contract holder. The method advances from step 246 to step 254. If, however, the carrier had canceled the mode of transport, then the carrier default value calculated at step 228 is debited to the carrier at step 250 and essentially simultaneously credited to the contract holder at step 252. The method advances from steps 250 and 252 to step 254.

At step 254, all debit and credit entries are saved to the transaction database to serve as a basis for a transaction history and any required reporting and billing in respect of the posted transactions.

As can be appreciated by those skilled in the art, a number of variations of the subject invention are possible. These variations include, but are not limited to: the use of a pop-up window instead of a pull-down menu when making decisions within the RDB locator program; the nature and scope of each of the hardware components of the data processing system; the ability of the system to handle more than one input point to, or output point from the system controller; the ability to scan data into the system; the length of time intervals employed at steps in querying the system for matches; and, the extent to which data can be downloaded from the system to either a transfer media or to another data processing system.

What is claimed is:

1. A method for listing and brokering carrier space comprising the steps of:
   (a) identifying a plurality of characteristics of said carrier space and entering said plurality of characteristics into a data processing system to establish a first exchange market for said carrier space based upon said plurality of characteristics;
   (b) identifying a market value for said carrier space and listing said value on said first exchange market
   (c) determining a class of derivatives based upon a pre-selected subset of said plurality of characteristics; and
   (d) establishing a second exchange market in respect of said derivatives.

2. The method of claim 1, wherein said first exchange market and said second exchange market are co-located within said data processing system.

3. The method of claim 1, wherein said data processing system utilizes a real time clock whereby said system can determine when said commodity listed in said data processing system can no longer be accessed because of a time/date threshold.

4. The method of claim 3, wherein said plurality of characteristics comprises:

(a) a geographic start point and a geographic end point;
(b) a start date and a finish date;
(c) a start time and a finish time;
(d) a volume;
(e) a mode of transportation; and
(f) a cost.

5. The method of claim 3, wherein said second plurality of characteristics comprises a Shipping Equivalent Unit.

6. The method of claim 5, wherein said Shipping Equivalent Unit further comprises:

(a) a common descriptive link between varied commodity types;
(b) a time period between contract date of said commodity and an expiration date for said contract; and
(c) a contract price.

7. The method of claim 6, wherein said common descriptive link comprises said start date and said finish date.

8. The method of claim 6, wherein said common descriptive link comprises a geographic region.

9. The method of claim 6, wherein said common descriptive link comprises a mode of transportation.

10. The method of claim 6, wherein said common descriptive link comprises a value per unit of measure.

11. The method of claim 3, wherein said entry of said plurality of characteristics of said carrier space comprises the steps of:

(a) determining whether or not said carrier space is being identified to said data processing system for a first instance; and
(b) storing said plurality of characteristics in a commodity database if said entry is of said first instance; and, determining status of said commodity if said entry is not of said first instance.

12. The method of claim 3, wherein determination of each of said class of derivatives comprises the steps of:

(a) determining whether or not said each derivative is being identified to said data processing system for a first instance; and
(b) storing said plurality of characteristics in a derivatives database if said entry is of said first instance; and, determining status of said each derivative if said entry is not of said first instance.

13. The method of claim 12, wherein said determination of status of said carrier space comprises:

(a) determining whether or not said carrier space is to be exchanged or sold; and, if said carrier space is not to be exchanged or sold then determining whether or not said carrier space is a derivative; and
(b) determining that if said carrier space is not to be exchanged or sold, and that said commodity is not a derivative, than said commodity is to be purchased or sold.

14. A system for listing and brokering a commodity comprising:

(a) data processing means for accepting and storing a first listing and/or subsequent listings of commodity parameters available where said commodity is available for sale or exchange, and wherein said data processing means has a real-time clock for comparing actual time with said commodity parameters;
(b) data processing means for entering a second listing of commodity parameters where said commodity is available for purchase or exchange;
(c) means for determining a matched entry on said first listing and/or said subsequent listings and said second listing based upon said comparison of said first listing and/or subsequent listings to said second listing;
(d) means for displaying said matched entry to a system operator;
(e) means for selecting said matched entry for purchase and/or exchange;
(f) means for determining a class of financial derivatives based upon a pre-determined set of characteristics resident in said commodity; and
(g) means for selecting said class of derivatives for purchase and/or exchange.

15. The system of claim 14, wherein said data processing means further comprises a system controller; said system controller further comprising:

(a) a data processing system comprising programs for the management of data;
(b) data entry means for entering data to said data processing system;
(c) memory means for storing data; and
(d) communication means for communicating data between said system controller and a plurality of input and output points; said plurality of input and output points for the input and output of data and comprising:
  (i) one or more commodity input points;
  (ii) one or more commodity receiver points;
  (iii) one or more commodity brokerage points; and
  (iv) one or more derivative exchange points.

16. The method of claim 15, wherein a plurality of said plurality of input and output points are co-located.

* * * * *